Figure 1:
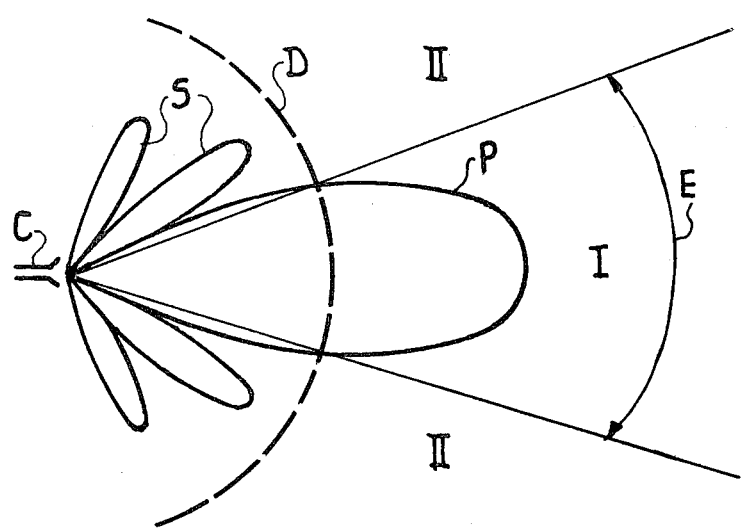

United States Patent [19]

Salvaudon et al.

[11] 4,143,372
[45] Mar. 6, 1979

[54] SIDE-LOBE BLANKING ARRANGEMENT FOR A RADAR SYSTEM

[75] Inventors: Laurence Salvaudon; Jean-Claude Charlot, both of Paris, France

[73] Assignee: Thomson-CSF, Paris, France

[21] Appl. No.: 837,861

[22] Filed: Sep. 29, 1977

[30] Foreign Application Priority Data

Oct. 5, 1976 [FR] France ................................ 76 29895

[51] Int. Cl.$^2$ .......................... G01S 9/22; G01S 7/66
[52] U.S. Cl. ............................. 343/16 M; 343/100 LE
[58] Field of Search ............... 343/100 LE, 7 A, 16 M

[56] References Cited

U.S. PATENT DOCUMENTS

| | | | |
|---|---|---|---|
| 3,167,761 | 1/1965 | Parquier | 343/100 LE |
| 3,343,166 | 9/1967 | Poinsard | 343/16 M |
| 3,747,100 | 7/1973 | Gulick, Jr. | 343/100 LE |

FOREIGN PATENT DOCUMENTS 1273015  7/1968  Fed. Rep. of Germany .... 343/100 LE

Primary Examiner—Maynard R. Wilbur
Assistant Examiner—Lawrence Goodwin
Attorney, Agent, or Firm—Cushman, Darby & Cushman

[57] ABSTRACT

The invention relates to an arrangement for suppressing the echos received in the side lobes of a main antenna of a radar system. An auxiliary antenna, whose diagram overlaps with the side lobes of the main antenna, supplies a signal $\vec{B}$ which is compared with the signal $\vec{A}$ from the main antenna. The comparison is performed between microwave signals or intermediate frequency signals by means of an operating circuit which emits signals $\vec{S_1} = \vec{A} + k_1\vec{B}$ and $\vec{S_2} = k_2(\vec{A} - k_1\vec{B})$ where $k_1$ and $k_2$ are amplitude and phase modifying complex coefficients, and an amplitude and phase demodulating circuit which receives $\vec{S_1}$ and $\vec{S_2}$, one of which may possibly be in phase quadrature. The presence of an off-center echo, for example, results in a threshold being exceeded by the filtered demodulated signal.

2 Claims, 7 Drawing Figures

SIDE-LOBE BLANKING ARRANGEMENT FOR A RADAR SYSTEM

This invention relates to radar systems and particularly to an arrangement which enable the echos received in the side lobes of the antenna of the system to be suppressed.

It is impossible in practice to substantially reduce the side lobes of an antenna known as a main antenna. To suppress the unwanted echos received in these side lobes and to retain only the echos received in the main lobe, it is usual to make use simultaneously of the signals received by the main antenna and of those which are received by an auxiliary antenna whose radiation diagram overlaps the side lobes of the main antenna. The auxiliary antenna may be omnidirectional and its radiation diagram may contain a gap at the point where the main lobe of the main antenna is situated.

The intersection between the two diagrams of the two antennas divides up the space into two domains. Echos from the part of the main lobe which extends beyond the diagram of the auxiliary antenna (the first domain) are accepted by the detection system. At the output from the main antenna, the amplitude of these echos is greater than the amplitude of those received from the auxiliary antenna. These echos are accepted and used by the radar system. In the other domain, the echos whose amplitude is greater at the output of the auxiliary antenna than at the output of the main antenna are suppressed.

This technique enables the limitations imposed by the presence of the side lobes to be overcome.

In the usual applications of this technique, the antenna array of the detection system is formed by two entirely independent antennas. The comparison between the amplitudes of the signals is performed directly, and calls for reception to be identical in both cases and for the two reception channels to be brought into phase. Care has therefore to be taken in setting up such systems and the need for an additional receiver in the auxiliary channel is sometimes a considerable disadvantage in airborne equipment.

The electromagnetic detection system according to the invention does not have these disadvantages and in particular forms an assembly of very small dimensions in comparison with known assemblies. In addition there is no longer any need to maintain phase in the two channels, thus helping with the setting up problems.

According to the invention the measure for comparing the amplitude of the signals in the main and auxiliary channels involves a vector combination of the signals which is easily performed, particularly if the system is already provided with a receiver of the monopulse kind i.e. one for making angular measurements of the direction in which echos lie with respect to the axis of the antenna.

In accordance with a feature of the invention, there is provided in a radar system, an arrangement for suppressing the echos received in the side lobes of a main antenna, said arrangement comprising:

an auxiliary antenna whose radiation diagram overlaps with the side lobes of the main antenna;

an operating circuit for receiving a signal $\vec{A}$ from the main antenna and a signal $\vec{B}$ from the auxiliary antenna and for supplying output signals $\vec{S}_1 = \vec{A} + k_1 \vec{B}$ and $\vec{S}_2 = k_2 (\vec{A} - k_1 \vec{B})$ where $k_1$ and $k_2$ are amplitude and phase modifying complex coefficients;

means for demodulating the amplitude and phase of signal $\vec{S}_1$ by signal $\vec{S}_2$, and means for comparing the demodulation signal with a reference signal and for supplying a suppression control signal when said reference signal is exceeded.

No matter what the phase difference between the signals $\vec{A}$ and $\vec{B}$, the result of the demodulation is positive if the amplitude of $\vec{A}$ is greater than the amplitude of $\vec{B}$ and negative in the opposite case.

The invention thus does away with the need to balance the phases in the two channels, i.e. one main and one auxiliary.

Figure 2:
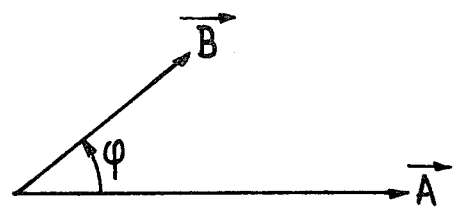
Figure 3:
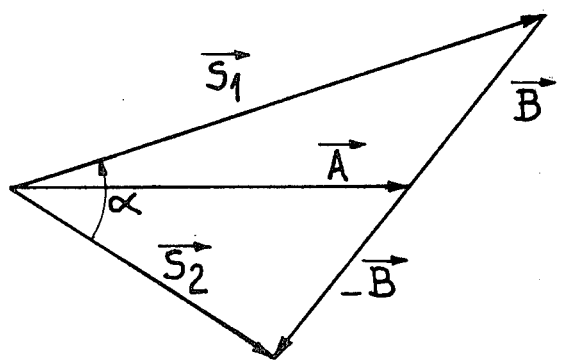

Other features and advantages of the invention will become apparent from the following description, which is illustrated by the FIGS. which show:

FIG. 1, the radiation diagrams of the main antenna and the auxiliary antenna,

FIGS. 2 and 3, vector representations of the signals in the channels, one main and the other auxiliary.

Figure 4:
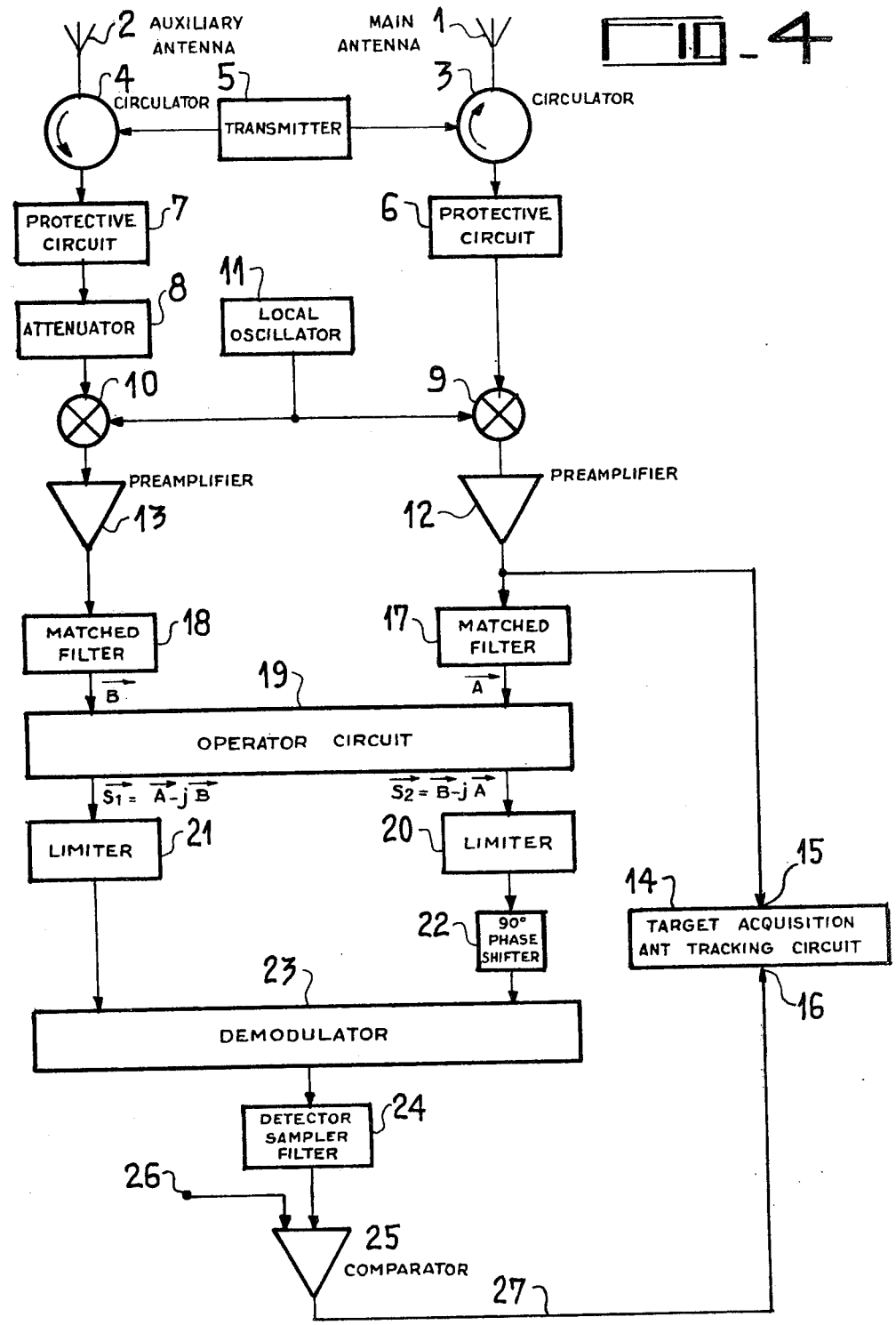

FIG. 4, an embodiment of the invention, and

Figure 5:
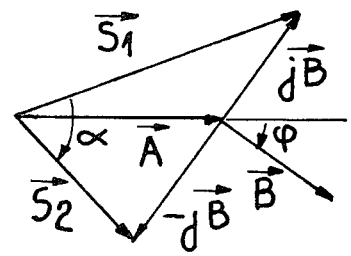
Figure 6:
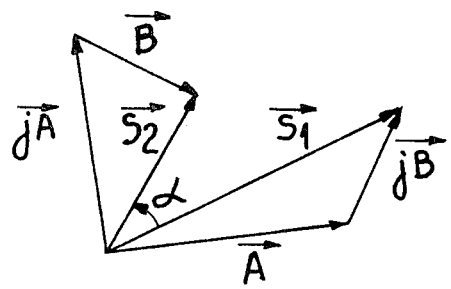
Figure 7:
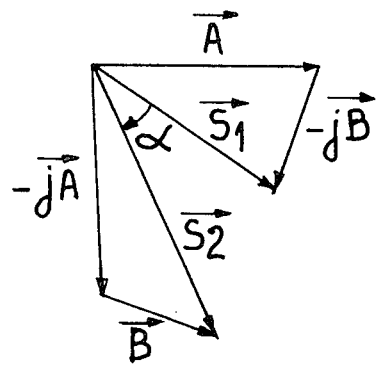

FIGS. 5, 6 and 7, three examples of signal combinations.

FIG. 1 shows the radiation diagrams of an array C of antennas which is made up of a main antenna whose directional diagram contains a main lobe P and unwanted side lobes S and of an omnidirectional auxiliary antenna which has a non-directional diagram D which overlaps with the side lobes S of the main antenna. The problem, consists in arranging matters so that only the echos received in the main lobe P are handled by the electromagnetic detection system associated with the antennas, and that any unwanted echo received in any of the side lobes S is suppressed.

Since the level of the signals received by the omnidirectional antenna is greater than that of the signals received in the side lobes of the main antenna, it is merely necessary to perform an amplitude comparison in order to determine whether an echo is situated in the main lobe or one of the side lobes. The intersection between diagrams D and P defines a cone-shaped region of shape I. Outside this cone (region II) it is the reverse which applies.

However, to perform an amplitude comparison between the two signals, it is necessary in principle that the two reception channels should be identical, that is to say that they should have the same gain and produce the same phase shift.

The invention makes it possible to dispense with this requirement. In effect, the amplitude comparison which is performed is independent of the difference in phase between the signals in the main and auxiliary channels. The phase shifts which then occur in the reception circuits are of no importance.

FIGS. 2 and 3 and the following explanation will enable the advantage afforded by the invention to be understood.

Let there be a signal which is represented by a vector $\vec{A}$, and a signal of the same frequency which is represented by a vector $\vec{B}$ and which is out of phase by an angle of Q with respect to vector A (FIG. 2).

FIG. 3 shows two additional vectors $S_1$ and $S_2$ which are formulated from $\vec{A}$ and $\vec{B}$ in such a way that:

$\vec{S}_1 = \vec{A} + \vec{B}$ $\vec{S}_2 = \vec{A} - \vec{B}$

Demodulating the amplitude and phase of $\vec{S}_1$ by using $\vec{S}_2$ gives a signal proportional to the scalar product of $\vec{S}_1$ and $\vec{S}_2$:

$$(\vec{S}_1 \cdot \vec{S}_2) = (\vec{A} + \vec{B}) \cdot (\vec{A} - \vec{B}) = |S_1| \cdot |S_2| \cos \alpha$$
$$= A^2 + AB \cos(\pi - \phi) + AB \cos(-\phi) + B^2 \cos(\pi)$$
$$= A^2 - B^2$$

thus, if $|\vec{A}| > |\vec{B}|$ then $\vec{S}_1 \cdot \vec{S}_2 > 0$ and if $|\vec{A}| < |\vec{B}|$ then $\vec{S}_1 \cdot \vec{S}_2 < 0$ This result holds good whatever the value of $\phi$.

Other combinations of the vectors $\vec{A}$ and $\vec{B}$ are of course possible. These other combinations may be written:

$$\vec{S}_1 = \vec{A} + k_1 \vec{B}$$
$$\vec{S}_2 = k_2 (\vec{A} - k_1 \vec{B})$$

where $k_1$ and $k_2$ are two amplitude and phase modifying complex co-efficients which represent either an amplitude gain or a phase rotation or both. Depending upon the type of operating circuit which is used to form one of the aforementioned combinations with predetermined values of $k_1$ and $k_2$, it may or may not be advisable to insert a phase-shifting circuit and/or an amplifier in one of the input channels of the demodulating circuit. These various possibilities will be considered further in the description with reference to FIGS. 5, 6 and 7.

FIG. 4 shows a group of circuits which are responsible for suppressing the echos received in region II of FIG. 1. The processing of the signals relies on simple, known techniques. The formation of the sum and difference of the received signals may be performed at microwave or intermediate frequency and the amplitude and phase demodulation is standard in many kinds of receiver.

The main antenna 1 of the detection system is associated with an omnidireactional auxiliary antenna 2. A transmitter 5 feeds the antennas via circulators 3 and 4. The received signals which are transmitted to the reception circuits are first applied to protective circuits 6 and 7. The signals in the auxiliary channel are then applied to an attenuator 8 so that their level can be adjusted to be slightly greater than that of the signals received in the side lobes of the main channel. The signals in the two channels are then demodulated in mixers 9 and 10 using a local oscillator 11 and are amplified by identical pre-amplifiers 12 and 13 and then filtered by matched filters 17 and 18. A operator circuit 19 receives the signal $\vec{A}$ in the main channel and the signal $\vec{B}$ in the auxiliary channel and emits $\vec{S}_1 = \vec{A} - j\vec{B}$ and $\vec{S}_2 = \vec{B} - j\vec{A}$.

The signal $\vec{S}_1$ and $\vec{S}_2$ are applied to limiting amplifiers 21 and 20 respectively. Signal $\vec{S}_2$ alone undergoes a 90° phase shift in a phase-shifter 22 and then a demodulator 23 receives the two signals $\vec{S}_1$ and $\vec{S}_2$. It then emits a signal whose sign indicates which is the greater of the received signals.

To allow processing in all the range windows, a circuit 24 is responsible for detecting, sampling and filtering the output signals from the demodulator in synchronisation with the activation of the range gates of the detecting system. This enables information to be obtained on the presence of a target in the main lobe of the antenna, not in the course of a single repetition cycle but, after integration, over a plurality of repetition cycles. A comparator 25, which receives a threshold signal at a terminal 26, then emits a logic signal which indicates whether or not an echo is received in the main lobe of the antenna. This logic signal is used to validate or inhibit the corresponding signal which is fed to target acquisition and tracking circuits for example.

These circuits are shown by way of illustration at 14. They receive the reception signals at an input 15. A connection 27 feeds to an input 16 the logic signal which is intended to inhibit or not to inhibit the signal from being processed in the circuit.

The system which has just been described thus enables those radar echos to be suppressed whose angle off, that is to say the angle between the direction of the echo and the axis of the antenna, is greater than a given angle.

If the radar is equipped with an antenna array of the monopulse type and already incorporates in addition to the sum channel one or two channels for making angular measurements (in elevation and bearing), it is possible to use one of these channels for angular measurement to suppress off-centre echos. In this case it is merely necessary to add to the radar an omnidirectional antenna to cover the side lobes of the main antenna and to process in a channel for angular measurement on the one hand the sum signal and on the other the signal in the auxiliary channel. To achieve the desired result it is therefore necessary to insert a 90° phase shifter upstream of one of the inputs of the demodulator. The size of the arrangement of the invention is thus reduced to the absolute minimum, provided that the auxiliary antenna and an angular measurement channel are used during the "search and acquisition" phase of the radar. During the phase of tracking a target, the need to eliminate off-centre echos is not so great and the angular divergence signals provided by the monopulse antenna are then processed in the conventional fashion.

As a supplement, FIGS. 5, 6, and 7 show three examples of vector combinations of the signal $\vec{A}$ and $\vec{B}$. FIG. 5, illustrates the case where $k_1 = j$ and $k_2 = 1$. In this case $\vec{S}_1 = \vec{A} + j\vec{B}$ and $\vec{S}_2 = \vec{A} - j\vec{B}$; j being the phase rotation operator of $\pi/2$. Since a variation in the phase of $\vec{B}$ relative to $\vec{A}$ does not affect the result of the comparison, this case is identical to that which is illustrated by FIG. 3; the signals which are supplied by the operator and limited are demodulated directly. A measurement is obtained of the cosine of the angle $\alpha$ between $\vec{S}_1$ and $\vec{S}_2$.

FIG. 6 illustrates the case where $k_1 = j$ and $k_2 = j$. For the same reason as before, the rotation of $\vec{B}$ by $\pi/2$ ($k_1 = j$) in no way affects the result. The rotation of $\vec{S}_2$ by $\pi/2$ ($k_2 = j$) on the other hand calls for there to be a 90° phase shift circuit between the $\vec{S}_1$ output of the operator and the corresponding input of the demodulator.

FIG. 7 illustrates the case where $k_1 = j$ and $k_2 = j$. The rotation of $\vec{S}_2$ by $-\pi/2$ requires there to be a circuit for shifting the phase of $S_2$ by $\pi/2$. This is the case with the embodiment shown in FIG. 4.

All the other cases which arise when the values of $k_1$ and $k_2$ are changed become one of the three cases above.

What is claimed is:

1. In a radar system with a main antenna array of the monopulse type, an arrangement for suppressing the echos received in the side lobes of said main antenna of said radar system, said arrangement comprising;
    an auxiliary antenna whose radiation diagram overlaps with the side lobes of the main antenna;

an operating circuit for receiving a signal $\vec{A}$ from the main antenna and a signal $\vec{B}$ from the auxiliary antenna and for supplying output signals $\vec{S}_1 = \vec{A} + k_1\vec{B}$ and $\vec{S}_2 = k_2 (\vec{A} - k_1\vec{B})$ where $k_1$ and $k_2$ are amplitude and phase modifying complex coefficients;

limiting circuits connected to the outputs of said operating circuit;

90° phase shifting means connected to the output of one of said limiting circuits;

demodulating means having two inputs respectively connected to the output of said 90° phase shifting means for demodulating one of said signals $\vec{S}_1$ and $\vec{S}_2$ in phase quadrature, by the other;

means for comparing the demodulation signal with a reference signal and for supplying a suppression control signal when said reference signal is exceeded.

2. The radar system as described in claim 1 wherein said amplitude and phase modifying complex coefficients are amplitude and phase modifying imaginary coefficients.

* * * * *